Dec. 23, 1947. T. W. STEPHENSON ET AL 2,433,169

SPARE TIRE MOUNTING

Filed Nov. 20, 1945

*T. W. Stephenson*
*A. J. Schumaker*
INVENTORS

Patented Dec. 23, 1947

2,433,169

UNITED STATES PATENT OFFICE 2,433,169

SPARE TIRE MOUNTING

Thomas W. Stephenson, Detroit, and Arthur J. Schumaker, Birmingham, Mich., assignors to Ford Motor Company, Dearborn, Mich., a corporation of Delaware Application November 20, 1945, Serial No. 629,872

7 Claims. (Cl. 296—37)

This invention relates to the construction of automotive bodies; and, more particularly, to a tire carrier arrangement adapted for use on station wagons and other vehicles having a swingable tail gate.

The station wagon type of body fulfills the particular needs of a considerable portion of the automotive purchasing public, combining—as it does— a large passenger or freight capacity with a distinctive appearance. While many variations of this type of body have been suggested and used, it has been generally found that to be satisfactory for the purpose for which it is designed, it is essential that it have a horizontally hinged tail gate which may be swung down, opening the back part of the vehicle so that upon removal of the seat otherwise positioned there, there is substantial room available for the cartage of baggage or produce.

However, since space is one of the prime considerations in this type of body, it is desirable to mount the spare tire outside of the body proper and it is customary to secure this on the rear of the tail gate or on the side of the vehicle. Neither of these positions have been entirely satisfactory. In the usual tail gate mounting interference between the tire and the vehicle bumper or the lower rear panel of the body is difficult to avoid when the tail gate is of the preferred proportions. Mountings elsewhere on the vehicle are undesirable since they either increase the side clearance required or demand special body components to mount the tire, adversely affecting the vehicle's appearance. It is therefore the purpose of this invention to devise a tire mounting and body construction having particular application to station wagons which will permit the mounting of the spare tire on a swingable tail gate and which will permit the tail gate to be fully lowered without occasioning limiting interference with the lower body panel. It is a further object of this invention to devise a rear end body treatment for the station wagon type of body which will be particularly neat in appearance and which will permit the carrying of the body line around the back of the vehicle which has not, heretofore, been practicable when clearance was required for the spare tire. Still another object of this invention is to devise a swingable door automatically operable on the lowering of the tail gate to provide a space to receive the tire when the gate is in its lowered position. Yet another object of the invention is to devise a floor arrangement which will give unimpeded and smooth entry to the rear portion of the station wagon and will make available the entire space for the cartage of the freight or produce.

The advantage of the present construction is that although the spare tire is mounted low enough on the tail gate where it does not impede the vision through the back window nor interfere with the operation of the upper swing gate, the tail gate nevertheless is easily swingable and no limiting interference exists between the spare tire and the body. Another advantage is that using the construction herein shown, it is possible to carry the lower side line of the body around the back beneath the swing gate, increasing the apparent depth of the body yet avoiding interference with the spare tire carried on the swing gate. Still another advantage of the present invention is that by using an automatically operable door on the lower panel of the back of the body, room is available to receive the spare tire when the tail gate is lowered and the operation is entirely automatic both on lowering and raising the tail gate and the decorative line of the body is not adversely affected when the gate is in either position. Yet another advantage is that the arrangement permits full and unimpeded access to the interior of the rear of the body and employs the internal space to maximum advantage.

Other advantages will be apparent from the consideration of the invention set forth in this specification, claimed in the following claims, and shown in the accompanying drawings, in which:

Figures 1, 2:
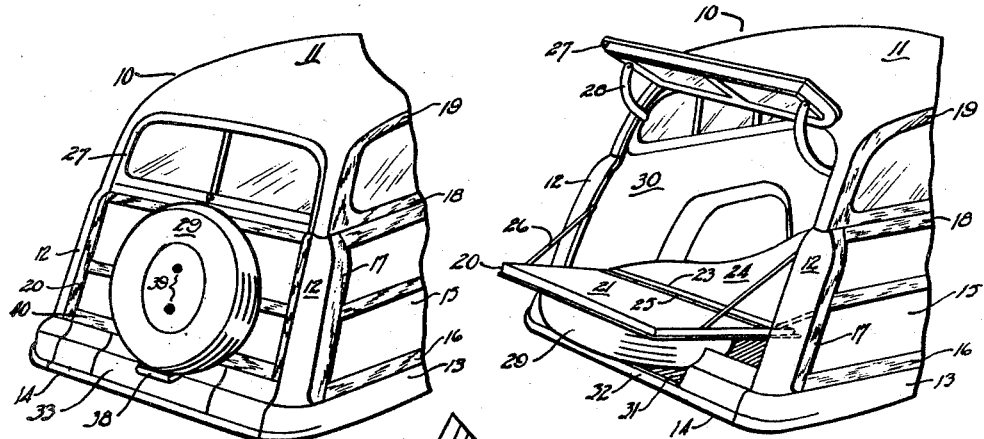
Figure 1 is a partial view of the rear end of a station wagon body showing the tail gate closed.
Figure 2 is a similar view showing both the tail gate and swing gate opened.
Figure 3:
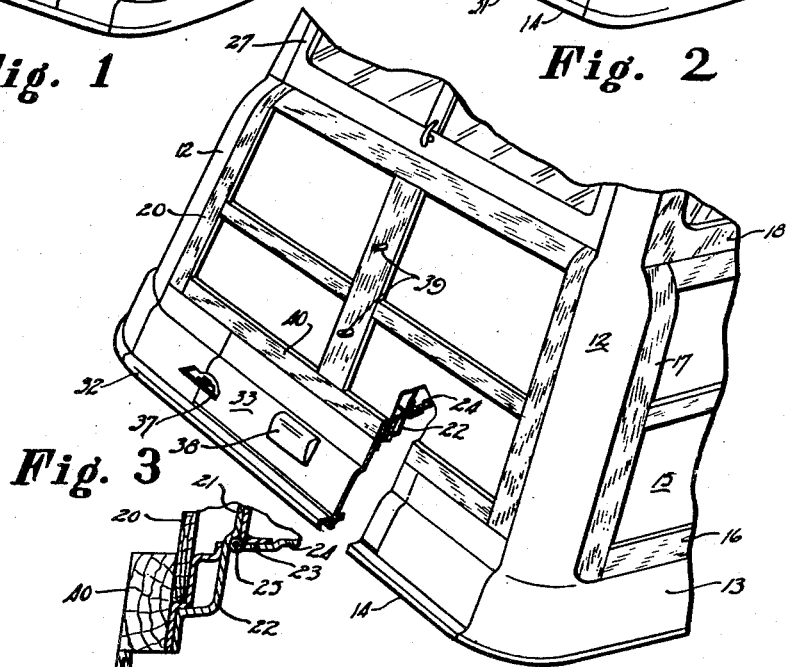
Figure 3 is an enlarged view of a portion of Figure 1 with the spare tire removed and sectioned in part to indicate the internal construction of the tail gate and tire panel.

Referring first to Figures 1 and 2, 10 indicates generally a station wagon body having a roof 11 supported on the rear corner pillars 12 which terminate in the side rocker panels 13, which have aligned with them the rear body panel 14 extending across the back of the body. A wooden side panel 15 having a lower edge rail 16, and edge rail 17, top edge rail 18 and the associated window framing 19 is secured in place with respect to the roof, pillar, and rocker panel to obtain the effect of a wooden body station wagon.

A tail gate 20 is constructed of a metal panel 21 terminating at its lower edge in a box section 22 and hinged above the box section to the rearward edge 23 of the vehicle floor 24 (see Figure 4), which extends between and is attached at each side to a metal side panel associated with the rocker panels 13 and the pillars 12 are disclosed in the copending application for station wagon filed this day. This metal side panel is usually covered with an interior trim panel 30.

Swinging about a piano hinge 25, the tail gate may assume the open position shown in Figure 2 in which its lower edge underlies the floor 24 and in which it is supported by the braces 26. Similarly, the swing gate 27 which is hinged along its upper edge to the rear of the roof 11 may be swung upwardly as here shown and held in place by the braces 28.

Figure 4:
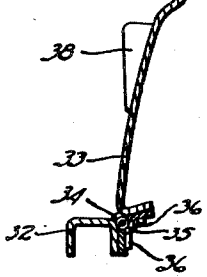
Figure 4 is a transverse section on an enlarged scale corresponding to the sectional showing of Figure 3.

The spare tire 29 is carried on a conventional type carrier (represented by the bolts 39) mounted on the rear surface of the tail gate and normally occupies the position shown in Figure 1. However, when the tail gate is moved to the position of Figure 2, it is apparent that further provision must be made for the tire to prevent interference with the rear body panel 14. In order to avoid this interference with the spare tire 29, the rear panel 14 is provided with a central opening 31 extending upwardly from the cross bar 32 which forms the lower transverse member of the rear panel 14 to the top of the panel. It is normally closed by a tire panel 33 mounted on the piano hinge 34 secured to the cross bar 32 and resiliently urged in a counterclockwise direction by the coil spring 35 surrounding the hinge pivot and having extending ends 36. However, the vertical edges of the tire panel 33 are flanged as at 37 so that the counterclockwise movement of the panel is limited to a position of alignment with the rear panel 14. A bumper block 38 is secured to the midportion of the rear surface of the tire panel 33 in the locality normally contacted by the spare tire when the tail gate is lowered to prevent damage to the finish of the tire panel 33 as best shown in Figure 4, the top edges of the panel 33 (when closed), and the rear body panel 14 are normally concealed by the lower rail 40 of the tail gate.

The operation of the device is believed to be quite clear from the foregoing. In normal appearance, the rear body panel 14 carrying out the line of the rocker panels and substantially in the plane of the closed tail gate is a continuous member. However, when the tail gate 20 is lowered, the spare tire 29 comes into contact with the bumper block 38 forcing the tire panel 33 inwardly against the resilient urging of the coil spring 35 as shown in Figure 2, thereby permitting the necessary clearance for the tire inwardly of the rear body panel and beneath the floor 24. When the tail gate is again moved to closed position with the spare tire attached, the tire panel 33 resumes its original position in response to the spring action and the rear body panel again appears to be an uninterrupted structural member. Further, since the tail gate is hinged slightly above its lower edge, the lower edge of the tail gate swings underneath the floor 24 giving a continuous and clean interior floor surface as is best seen from Figure 2, while the spare tire occupies space otherwise unused and does not reduce the available capacity of the interior of the vehicle. The construction is sturdy and dependable and noiseless both in operation and in either the open or closed position. Moreover, it is entirely automatic and requires no special maintenance.

It is realized that certain changes may be made in the specific construction herein shown and it is the intention to cover by the claims such of these changes as are reasonable within the scope thereof.

The invention claimed is:

1. In an automotive body construction, a swingable tail gate hinged adjacent one edge, a mounting on the outer surface of said tail gate adapted to secure a spare tire thereon with a portion of said tire overlying said hinged edge, and a normally closed hinged body panel having its swinging edge adjacent the hinged edge of said tail gate and so positioned as to be engaged and opened by a spare tire on said tail gate mounting as said tail gate is opened.

2. In an automotive body construction, a swingable tail gate hinged adjacent one edge, a mounting on the outer surface of said tail gate adapted to secure a spare tire thereon with a portion of said tire overlying said hinged edge, a normally closed hinged body panel having its swinging edge adjacent the hinged edge of said tail gate, resilient means urging said body panel into substantial alignment with said tail gate when said tail gate is closed, said body panel being so positioned as to be engaged and opened against the resilient resistance of said means by a spare tire on said tail gate mounting as said tail gate is opened.

3. In an automotive body construction, a swingable tail gate hinged adjacent one edge, a mounting on the outer surface of said tail gate adapted to secure a spare tire thereon with a portion of said tire overlying said hinged edge, a hinged body panel having its swinging edge adjacent the hinged edge of said tail gate, resilient means normally urging said body panel into alignment with the closed position of said tail gate and with the rear of said body, said body panel being so positioned as to be engaged and opened against the urging of said resilient means by a spare tire on said tail gate mounting as said tail gate is opened.

4. In an automotive body construction, a body floor, a tail gate hingedly secured adjacent its lower edge to said floor, a mounting on the outer surface of said tail gate adapted to secure a spare tire thereon, a transverse rear body member abutting the hinged edge of said tail gate when said tail gate is in closed position, an opening in said body member, a hinged panel mounted in said opening having its swinging edge adjacent the hinged edge of said tail gate when said tail gate is in closed position, resilient means normally urging said panel into alignment with said member and the closed position of said tail gate, said hinged panel being so positioned as to be engaged and opened by a spare tire on said tail gate mounting as said tail gate is opened.

5. The structure of claim 4 which is further characterized in that said tail gate is hinged to said floor a substantial distance above the lower edge thereof, said tail gate in open position having said lower edge positioned forwardly of the rear edge of said floor.

6. The structure of claim 4 which is further characterized in that means are provided effective between said panel and said member to limit the outward movement of said panel in response to said resilient means.

7. The structure of claim 4 which is further characterized in that said panel is automatically restored to the original aligned position by said resilient means when said tail gate is closed.

THOMAS W. STEPHENSON.
ARTHUR J. SCHUMAKER.

REFERENCES CITED

The following references are of record in the file of this patent:

UNITED STATES PATENTS

| Number | Name | Date |
|---|---|---|
| 2,117,049 | Widman et al. | May 10, 1938 |
| 2,045,489 | Payette | Nov. 27, 1935 |
| 2,102,110 | Burkey | June 10, 1935 |

FOREIGN PATENTS

| Number | Country | Date |
|---|---|---|
| 244,356 | Great Britain | Dec. 17, 1925 |
| 389,303 | Great Britain | Mar. 16, 1933 |